(12) United States Patent
Marks

(10) Patent No.: US 9,575,801 B2
(45) Date of Patent: Feb. 21, 2017

(54) ADVANCED PROCESSING DATA STORAGE DEVICE

(75) Inventor: Scott Chesser Marks, Chapel Hill, NC (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 1611 days.

(21) Appl. No.: 12/641,738

(22) Filed: Dec. 18, 2009
(Under 37 CFR 1.47)

(65) Prior Publication Data
US 2011/0153870 A1   Jun. 23, 2011

(51) Int. Cl.
*G06F 3/00* (2006.01)
*G06F 9/48* (2006.01)
*G06F 3/06* (2006.01)
*G06F 13/12* (2006.01)

(52) U.S. Cl.
CPC ............. *G06F 9/4843* (2013.01); *G06F 3/061* (2013.01); *G06F 3/0601* (2013.01); *G06F 3/0659* (2013.01); *G06F 3/0664* (2013.01); *G06F 3/0679* (2013.01); *G06F 3/0689* (2013.01); *G06F 13/126* (2013.01); *G06F 2209/509* (2013.01)

(58) Field of Classification Search
None
See application file for complete search history.

(56) References Cited

U.S. PATENT DOCUMENTS

| 5,335,352 | A | 8/1994 | Yanai et al. |
| 5,784,602 | A * | 7/1998 | Glass et al. .................. 712/220 |
| 6,826,630 | B2 | 11/2004 | Olds et al. |
| 7,421,303 | B2 | 9/2008 | Zhang et al. |
| 8,001,171 | B1 * | 8/2011 | Simkins et al. ............. 708/404 |
| 2001/0012315 | A1 * | 8/2001 | Kontola ........................ 375/148 |
| 2002/0013892 | A1 * | 1/2002 | Gorishek et al. ............ 712/227 |
| 2008/0270843 | A1 * | 10/2008 | Winarski et al. .............. 714/42 |
| 2008/0320241 | A1 | 12/2008 | Dees et al. |

FOREIGN PATENT DOCUMENTS

| WO | 92/15054 | 9/1992 |
| WO | 92/15058 | 9/1992 |

OTHER PUBLICATIONS

Yu Zhang and Dan Feng, Abstract for "An Active Storage System for High Performance Recruiting," Advanced Information Networking and Applications, Mar. 2008 (1 page printed from http://ieeexplore.ieee.org).

* cited by examiner

*Primary Examiner* — Henry Tsai
*Assistant Examiner* — Aurangzeb Hassan
(74) *Attorney, Agent, or Firm* — Cesari & Reed, LLP; Kirk A. Cesari

(57) ABSTRACT

The disclosure is related to systems and methods of using a data storage device's processing power to perform mathematical operations on data within a data storage device. The mathematical operation may be done independently of a host system and the data storage device may provide a calculated result to the host system instead of providing stored data. In a particular embodiment, the data storage device may perform a convolution operation on data received from a host, compare the result of the convolution operation to data comprising a set of potential matches previously stored on the data storage device, and select at least one of the set of potential matches to provide as a result to the host.

12 Claims, 2 Drawing Sheets

ADVANCED PROCESSING DATA STORAGE DEVICE

BACKGROUND

The present disclosure is generally related to executing commands on a data storage device.

SUMMARY

In one embodiment, a data storage device comprises: an interface configured to receive a data storage command, first data associated with the data storage command, and a data processing command from a host; a data storage medium; and at least one processor coupled to the interface and the data storage medium. The at least one processor comprises a first instruction set comprising data storage and retrieval instructions and a second instruction set comprising data processing instructions not related to data storage and retrieval, the data processing instructions comprising a mathematical operation. The at least one processor is configured to execute at least one instruction from the first instruction set to perform the data storage command and an instruction from the second instruction set to perform the mathematical operation on second data associated with the data processing command to produce a result. The at least one processor is further configured to transmit the result to a host processor via the interface.

In another embodiment, a system comprises a data storage device having a first processor, an interface, a data storage medium, and a second processor external to the data storage device. The second processor coupled to the data storage device via the interface and configured to execute multiple process threads in parallel, send an instruction to the data storage device via the interface, execute at least one process thread of the multiple process threads at the first processor causing the first processor to perform a mathematical operation on data within the data storage device to produce a result, and receive the result from the data storage device.

Another embodiment comprises a computer readable medium having instructions to cause a processor to perform a method. The method comprises sending an instruction to a removable data storage device to execute a command to perform a mathematical operation on data within the data storage device to produce a result and receiving the result from the data storage device.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
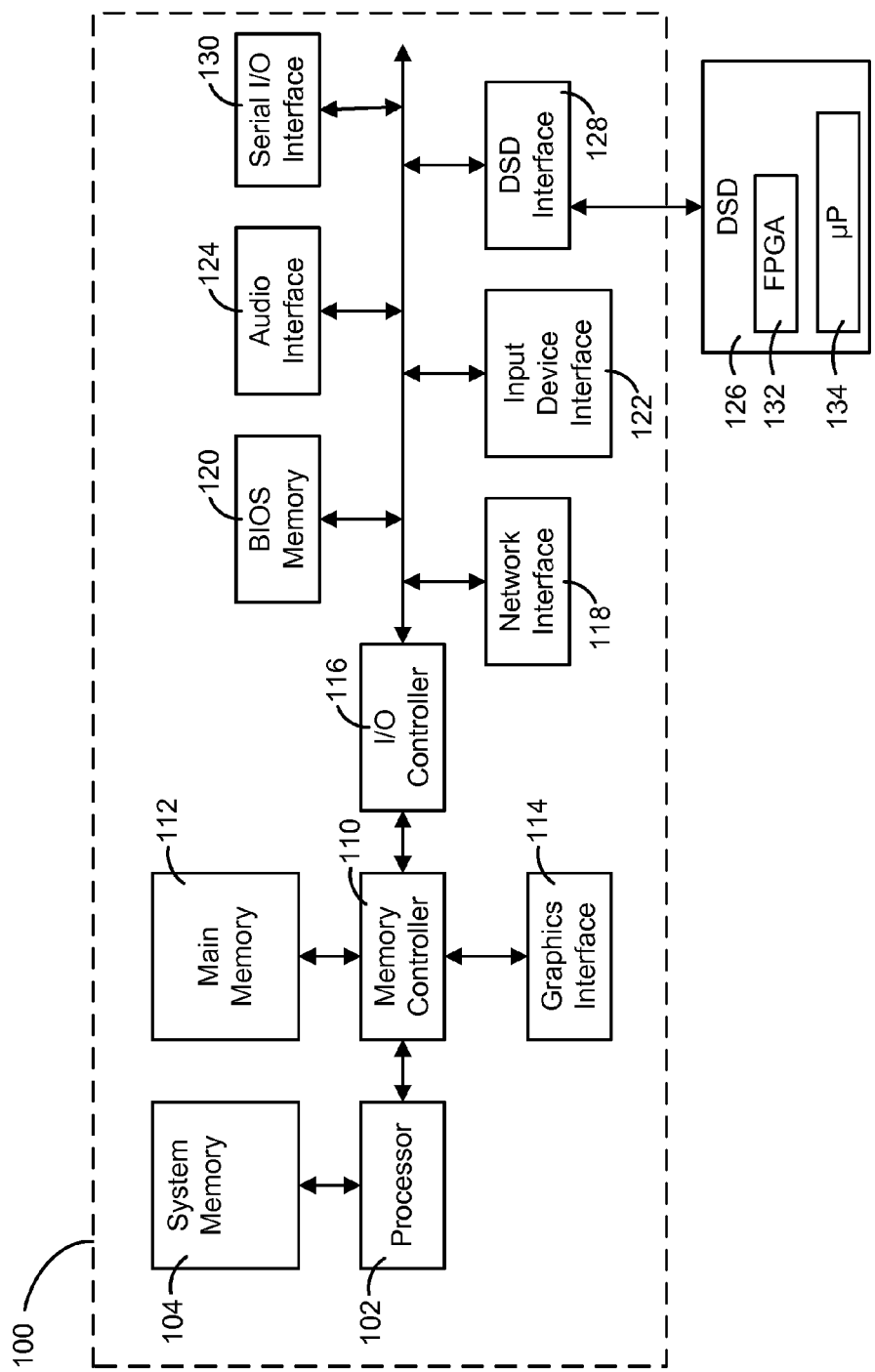
FIG. 1 is a diagram of an illustrative embodiment of a system with an advanced processing data storage device.

Referring to FIG. 1, a particular embodiment of a computer system is shown and generally designated 100. The computer system 100 can be a desktop computer, a laptop computer, a server, a personal digital assistant (PDA), a telephone, a music player, another electronic device, or any combination thereof. The computer system 100 may also be referred to as a host or host computer. The host 100 may include a central processing unit (CPU) 102 that may be a processor, controller, digital signal processor, reduced instruction set computer (RISC), application specific integrated circuit (ASIC), and the like. Although shown with one CPU 102, the computer system 100 may alternatively include multiple processing units. The CPU 102 may be connected to a system memory 104 that may be a random access volatile memory, such as synchronous dynamic random access memory (SDRAM). System memory 104 may optionally be any type of high speed memory device or memory circuitry.

The CPU 102 may also be coupled to a memory controller 110 that can be coupled to a main memory 112 and a graphics interface 114. The memory controller 110 can provide an interface to allow the CPU 104 or other devices to access the main memory 112. The main memory 112 may be volatile random access memory (RAM) and can be composed of one or more memory modules. The memory controller 110 can include logic for mapping addresses to and from the CPU 102 and other devices to particular areas of the main memory 112. The graphics interface 114 may include a video controller (not shown) and video memory (not shown) that may be connected to a display. The memory controller 110 can handle communications between the CPU 102, the main memory 112, the graphics interface 114, and an input/output (I/O) controller 116 that is coupled to the memory controller 110.

The I/O controller 116 can provide an interface for the CPU 104 to access other devices, such as a network interface 118, a basic input output system (BIOS) memory 120, various input devices such as a keyboard or mouse via an input device interface 122, an audio speaker or microphone via an audio interface 124, a data storage device 126 via a data storage device interface 128, and serial I/O devices via a serial I/O interface 130. The BIOS memory 120 may be flash memory or read-only-memory (ROM) and can contain the firmware code to initialize the BIOS and the hardware of the computer system 100 and load an operating system to the system memory 104.

The data storage device interface 128 may be any interface that allows attachment of data storage devices. In a particular embodiment, the data storage device interface 128 comprises an interface that allows attachment of a disc drive, such as USB, IEEE 1394, Compact Flash, SATA, eSATA, PATA, SCSI, SAS, or Fiber Channel. The data storage device 126 may be internal or external to a case of the computer system 100. In another embodiment, the I/O controller 116 and the data storage device interface 128 may include logic to support attaching a redundant array of independent discs (RAID); thus, the data storage device 126 may comprise a RAID system.

In a particular embodiment, the data storage device 126 may include a field programmable gate array (FPGA) 132 and a microprocessor 134. The data storage device 126 may be any type of data storage device, including a solid state storage device, a disc drive storage device, or a hybrid data storage device. A hybrid data storage device as discussed herein is a data storage device having both a magnetic recording medium and a nonvolatile solid state storage medium. In a particular embodiment, the data storage device 126 includes a connector (not shown) that permits the data storage device 126 to be removable (i.e. disconnectable) from the computer system 100.

In a particular embodiment, the processor 102 may execute multiple process threads in parallel and send an instruction to the data storage device 126, via the interface 128, to execute at least one process thread of the multiple process threads at the FPGA 132 or the processor 134. The process thread executed at the data storage device 126 may cause a mathematical operation to be performed on data within the data storage device to produce a result.

During operation, the processor 102 may send a command to the data storage device 126 to perform a function on data within the data storage device 126. The command may be for the data storage device 126 to execute a sub-process of a process that the processor 102 is executing. The command may include information to identify a particular function to be performed by the data storage device 126. In a particular embodiment, the function performed by the data storage device includes a mathematical operation.

When the command is received by the storage device 126, instead of providing read data to the host 102, the data storage device 126 may execute one or more instructions to perform the function within the data storage device 126 and send a result of the function back to the host 102 without providing the underlying data the function was performed on to the host. In a particular embodiment, the FPGA 132 may execute the instructions within the data storage device 126 to perform the function requested by the host 102. The FPGA 132 may perform the function on data stored in buffers within the data storage device 126 without transferring data to the host 102 over the interface 128. While the function has been discussed as being done by the FPGA 132, the function could likewise be performed by the processor 134 or any engine having sufficient computational power. For example, an application specific integrated circuit (ASIC) or a system-on-a-chip may be implemented to perform the functions and processes described herein.

The function performed by the data storage device 126 may include data transformations that produce a result that did not exist at the data storage device prior to the transformation. In a particular embodiment, the function is a mathematical operation, such as a convolution or Fourier transform. In another particular embodiment, the host 102 may only require a result to be returned from the data storage device 126, such as a matching index or a yes/no answer, which could be transferred in a single status-like command.

In a particular embodiment, the function is a convolution that consists of an operation of the form: $(f*g)(x)=\int f(t)g(x-t)dt$ for data input functions $f(t)$ and $g(t)$. f and g may be represented as discrete samples $f_i$ and $g_i$ where the values may be real or complex numbers and the integration can be replaced by a summation. To implement such a convolution efficiently, the fast Fourier transform (FFT), F and G of f and g, respectively, may be computed. Then the results of the FFT may be multiplied and the inverse FFT may be computed to obtain the final result. Mathematically, the FFT and convolutions in general, only require that the values are members of a field; thus, some of the processes described herein may be useful to applications that use fields other than complex real numbers, such as Gaussian integers.

In a particular embodiment, the data storage device 126 may be used to perform a matching analysis. The data storage device could be pre-loaded with data, which may be a large quantity such as one terabyte and greater. The data storage device 126 may then receive a command and particular data from the host 100 to perform a matching or comparison function between the particular data and the pre-loaded data. The data storage device 126 may then provide a result indicating matches, potential matches, or a yes/no match depending on the result expected in response to the command. Provided below are a few examples.

In one example, the data storage device 126 could be pre-loaded with data representing fingerprint patterns. The data storage device 126 may then perform a transformation of the fingerprint pattern data, such as a convolution. However, this step may be done prior to storing the pre-loaded data on the data storage device 126. Then, the host 100 may send a command to the data storage device 126 to do a comparison; the command may include data representing a single fingerprint. The data storage device 126, and in particular the FPGA 132, may similarly transform the single fingerprint data, compare the transformed single fingerprint data to the pre-loaded data, and return a result to the host 100 indicating whether a match has been made. The data storage device 126 may send the host 100 a list of the matches that may include a list of the storage locations of the matches. A level of matching that is needed to return a positive match, or potential match, may be set by the host 100 via a command or may be preset according to design considerations. Using convolutions to do the matching can allow the single fingerprint, represented by the single fingerprint data, to possibly include rotated fingerprint images or partial fingerprints.

Similar applications that could also be performed by the data storage device 126 may include performing facial recognition matching, DNA sequence matching, voice recognition matching, general analysis of scientific data, or any other application that may need to compare an example against a large set of data to find matches. Another example of an application may be comparison of an output of a gas chromatograph against a database of known compound signatures. In addition, the data storage device 126 may use a transformation, such as a convolution, to process images and apply corrective measures to enhance the images, such as to correct optical errors or motion bur or focus issues. For example, such an application may include processing of satellite imagery that needs to be processed for corrections or enhancements. Images could be matched against numerous targets, even in the presence of rotation, perspective transformations, or image degradation.

Performing the functions, or algorithms, within the data storage device 126 allows for very high-speed transformations without a need to send large quantities of data over the bus to the host 100. Thus, any algorithm that can take advantage of being executed in close proximity to large quantities of data may benefit from this system and process.

Figure 2:
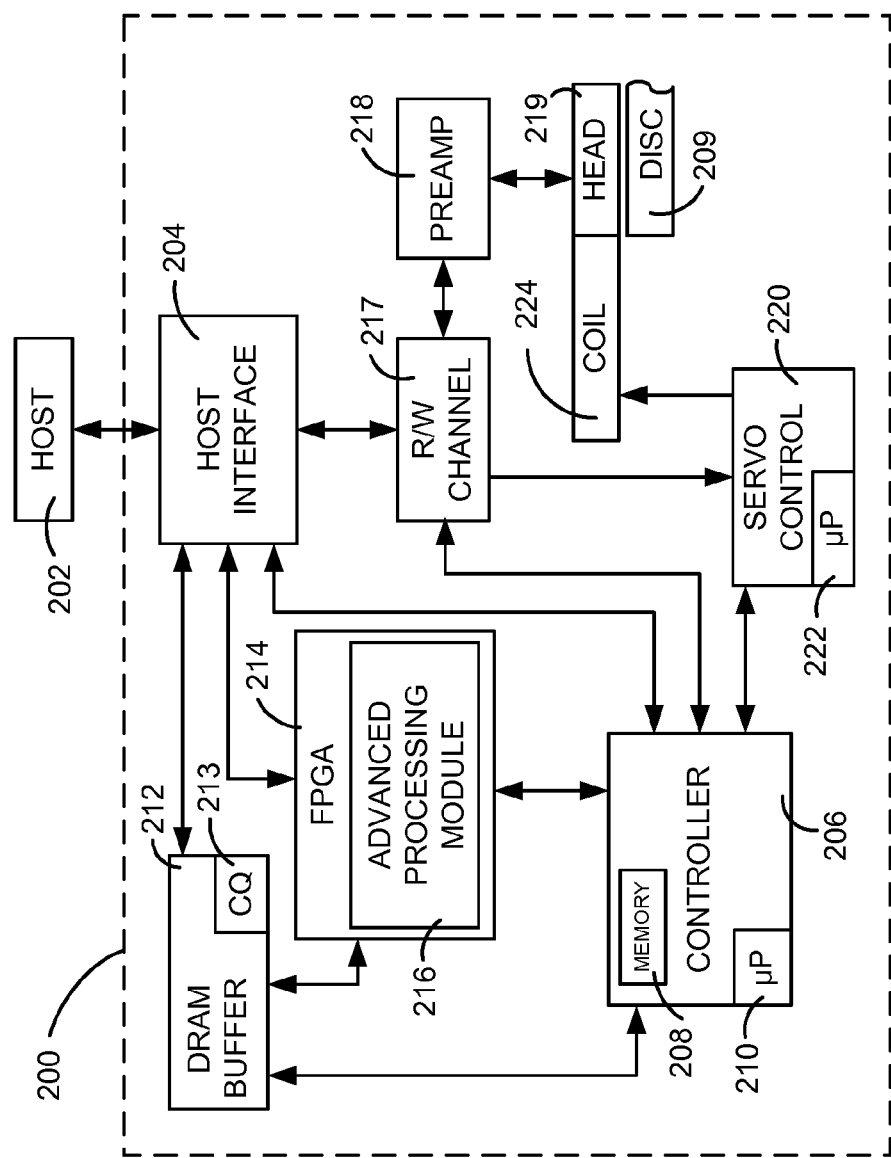
FIG. 2 is an illustrative embodiment of an advanced processing data storage device.

Referring to FIG. 2, a particular embodiment of a data storage device is shown and generally designated 200, the data storage device 200 may be used as the data storage device 126 shown in FIG. 1. Specifically, FIG. 2 provides a functional block diagram of a disc drive data storage device. The data storage device 200 can communicate with a host device 202 (such as the computer system 100 shown in FIG. 1) via a hardware/firmware based interface circuit 204 that may include a connector that allows the data storage device 200 to be physically removed from the host 202. The data storage device 200 includes a programmable controller 206 with associated memory 208 and processor 210. The programmable controller 206 may be coupled to a buffer 212. The buffer 212 can temporarily store user data during read and write operations and can include a command queue (CQ) 213 where multiple pending access operations can be temporarily stored pending execution.

Further, FIG. 2 further shows the data storage device 200 to include a read/write (R/W) channel 217 which encodes data during write operations and reconstructs user data retrieved from disc(s) 209 during read operations. A preamplifier/driver circuit (preamp) 218 applies write currents to the head(s) 219 and provides pre-amplification of readback signals. A servo control circuit 220 uses servo data to provide the appropriate current to the coil 224 to position the head(s) 219. The controller 206 can communicate with a processor 222 to move the head(s) 219 to the desired locations on the disc(s) 209 during execution of various pending commands in the command queue 213.

In a particular embodiment, the data storage device 200 may also include an FPGA 214 that includes an advanced processing module 216. The advanced processing module 216 may include logic or instructions to perform transformations on data. The transformations may include mathematical operations, such as convolutions or Fourier transforms. The advance processing module 216 may also include logic or instructions to perform other functions, such as comparisons and sorting of results.

During operation, the host 202 may send a command to the data storage device 200 to perform a function related to data stored within the data storage device 200. The command may include information to identify a particular function to be performed by the data storage device 200. In a particular embodiment, the command sent to the data storage device 200 instructs the data storage device 200 to perform a sub-process of a process being performed at the host 202. The host 202 may then use a result of the sub-process performed at the data storage device 200 in the process.

In a particular embodiment, the data storage device 200 includes a first instruction set comprising data storage and retrieval instructions. The first instruction set may be stored at and executed at the controller 206. The data storage device 200 may also include a second instruction set comprising data processing instructions, where the data processing instructions are not related to data storage and retrieval. The data processing instructions may comprise a mathematical operation or data transformation. The second instruction set may be executed at the FPGA 214.

The FPGA 214 and the advanced processing module 216 may perform the function and provide the result to the host 202 via the interface 204. The FPGA 132 may perform the function using data stored within the data storage device 200 without transferring all of the data from the host 202 over the interface 204.

The function performed by the data storage device 200 may include data transformations that produce a result that did not exist at the data storage device prior to the transformation. In a particular embodiment, the function is a mathematical operation, such as a convolution or Fourier transform. In another particular embodiment, the host 202 may only require a result to be returned from the data storage device 200, such as a matching index or a yes/no answer, which could be transferred in a single status-like command.

In accordance with various embodiments, the methods described herein may be implemented as one or more software programs running on a computer processor or controller, such as the processor 134, the FPGA 132 or 214, or the controller 206. Dedicated hardware implementations including, but not limited to, application specific integrated circuits, programmable gate arrays, and other hardware devices can likewise be constructed to implement the methods described herein. The systems and methods described herein can be applied to any type of data storage system and could also be applied to any type of peripheral device that has processing capabilities.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a data storage device comprising a first processor, an interface, and a data storage medium;
   a second processor external to the data storage device, coupled to the data storage device via the interface, and configured to:
   execute multiple process threads in parallel;
   send an instruction to the data storage device, via the interface, to execute at least one process thread of the multiple process threads at the first processor, causing the first processor to perform a mathematical operation on data within the data storage device to produce a result; and
   receive the result from the data storage device.

2. The system of claim 1 further comprising wherein the instruction is sent to the data storage device from the second processor to execute a sub-process of a process comprising the multiple process threads and the second processor utilizes the result in the process.

3. The system of claim 1 wherein the first processor further comprises a command that is configured to produce the result when the instruction is received.

4. The system of claim 3 wherein the command is configured to:
   perform the mathematical operation on the data to produce a preliminary result;
   compare the preliminary result to a set of potential matches; and
   select one of the potential matches as the result.

5. The system of claim 4 wherein the set of potential matches has been previously stored to the data storage device prior to the instruction being sent by the second processor.

6. The system of claim 4 wherein the mathematical operation comprises a convolution.

7. The system of claim 1 wherein the data storage device further comprises:
   an interface configured to receive data storage commands and the instruction from the second processor;

the first processor coupled to the interface and the data storage medium, the first processor comprising:
- a first command set comprising instructions corresponding to the data storage commands to store data to and retrieve data from the data storage medium;
- a second command set comprising data processing commands not related to data storage and retrieval, the data processing commands comprising the mathematical operation;

the first processor configured to execute a data processing command from the second instruction set to perform the mathematical operation on the data to produce the result when the instruction received from the second processor corresponds to the second command set; and the first processor configured to transmit the result to the second processor via the interface.

8. The system of claim 7 wherein the data storage device further comprises a connector to plug into a host having the second processor and the interface comprises a standardized interface that allows a disc drive to communicate with the host.

9. A device comprising:
an interface configured to receive data storage commands from a host and receive a separate data processing command from a host;
at least one processor coupled to the interface and adapted to:
execute the data processing command from the host to perform a mathematical operation independent of the host on data; and transmit the result to the host via the interface,
the data storage commands include a read command wherein the device provides data stored on a data storage medium within the device in response to the read command; and
the data processing command identifies the mathematical operation and the data storage device provides a calculated result to the host system instead of providing data stored within the device.

10. The device of claim 1 further comprising the mathematical operation includes a Fast Fourier Transform (FFT) and during execution of the data processing command: the FFT is performed on data to produce a first result, the first result is compared to a set of potential results, a second result is selected from one of the potential results, and the second result is provided to the host.

11. The device of claim 1 wherein the calculated result does not exist at the host or at the device prior to the mathematical operation being performed.

12. The device of claim 9 further comprising:
a data storage medium wherein the data includes data stored in the data storage medium; and
the processor is adapted to process the data processing command to determine a calculated result based on the data and send the calculated result to the host instead of the data.

* * * * *